US008135645B2

(12) United States Patent
Kay et al.

(10) Patent No.: US 8,135,645 B2
(45) Date of Patent: Mar. 13, 2012

(54) KEY DISTRIBUTION FOR SECURE MESSAGING

(75) Inventors: Jeffrey B. Kay, Bellevue, WA (US);
Eric D. Tribble, Bellevue, WA (US);
Roy Williams, Woodinville, WA (US);
Trevor W. Freeman, Sammamish, WA (US); Malcolm E. Pearson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 588 days.

(21) Appl. No.: 11/276,534

(22) Filed: Mar. 3, 2006

(65) Prior Publication Data

US 2007/0130084 A1    Jun. 7, 2007

Related U.S. Application Data

(60) Provisional application No. 60/742,639, filed on Dec. 6, 2005.

(51) Int. Cl.
*G06F 17/60* (2006.01)
*G06F 21/00* (2006.01)

(52) U.S. Cl. ............................ 705/51; 705/57; 380/201
(58) Field of Classification Search .................. 713/154, 713/155, 167; 705/51, 57
See application file for complete search history.

(56) References Cited

U.S. PATENT DOCUMENTS

| 4,747,139 | A | * | 5/1988 | Taaffe | 380/44 |
|---|---|---|---|---|---|
| 4,817,140 | A | * | 3/1989 | Chandra et al. | 705/55 |
| 5,003,410 | A | * | 3/1991 | Endoh et al. | 360/60 |
| 5,033,084 | A | * | 7/1991 | Beecher | 705/56 |
| 5,034,980 | A | * | 7/1991 | Kubota | 713/189 |
| 5,155,768 | A | * | 10/1992 | Matsuhara | 463/29 |
| 5,191,573 | A | * | 3/1993 | Hair | 369/84 |
| 5,199,066 | A | * | 3/1993 | Logan | 726/29 |
| 5,418,713 | A | * | 5/1995 | Allen | 705/32 |
| 5,481,613 | A | | 1/1996 | Ford et al. | |
| 5,509,074 | A | * | 4/1996 | Choudhury et al. | 713/176 |
| 5,592,651 | A | * | 1/1997 | Rackman | 711/163 |
| 5,621,796 | A | * | 4/1997 | Davis et al. | 705/68 |
| 5,623,547 | A | * | 4/1997 | Jones et al. | 705/68 |
| 5,636,276 | A | * | 6/1997 | Brugger | 705/54 |
| 5,661,799 | A | * | 8/1997 | Nagel et al. | 705/52 |
| 5,673,316 | A | * | 9/1997 | Auerbach et al. | 705/51 |
| 5,675,734 | A | * | 10/1997 | Hair | 705/51 |
| 5,677,953 | A | * | 10/1997 | Dolphin | 705/51 |
| 5,715,314 | A | * | 2/1998 | Payne et al. | 705/78 |
| 5,724,424 | A | * | 3/1998 | Gifford | 705/79 |
| 5,734,823 | A | * | 3/1998 | Saigh et al. | 709/229 |
| 5,734,891 | A | * | 3/1998 | Saigh | 1/1 |
| 5,742,845 | A | * | 4/1998 | Wagner | 710/11 |

(Continued)

FOREIGN PATENT DOCUMENTS

CN    1691574    11/2005

(Continued)

OTHER PUBLICATIONS

Hellman, 'An Overview of Public Key Cryptography', IEEE Communications Magazine 50th Commemorative Issue, May 2002, pp. 42-49.

(Continued)

*Primary Examiner* — Evens J Augustin

(57) ABSTRACT

A transmitting gateway may utilize a retrieved domain-specific key to secure an outbound message, and a receiving gateway may utilize another retrieved domain-specific key to authenticate and validate the secured message.

13 Claims, 4 Drawing Sheets

U.S. PATENT DOCUMENTS

| | | | | |
|---|---|---|---|---|
| 5,745,568 A * | 4/1998 | O'Connor et al. | | 705/56 |
| 5,748,735 A | 5/1998 | Ganesan | | |
| 5,754,649 A * | 5/1998 | Ryan et al. | | 380/203 |
| 5,757,907 A * | 5/1998 | Cooper et al. | | 705/52 |
| 5,778,421 A * | 7/1998 | Nagano et al. | | 711/115 |
| 5,790,677 A * | 8/1998 | Fox et al. | | 705/78 |
| 6,073,242 A | 6/2000 | Hardy et al. | | |
| 6,263,435 B1 | 7/2001 | Dondeti et al. | | |
| 6,289,105 B1 | 9/2001 | Murota | | |
| 6,385,596 B1 * | 5/2002 | Wiser et al. | | 705/51 |
| 6,393,568 B1 | 5/2002 | Ranger et al. | | |
| 6,469,239 B1 * | 10/2002 | Fukuda | | 84/602 |
| 6,504,089 B1 * | 1/2003 | Negishi et al. | | 84/609 |
| 6,535,919 B1 * | 3/2003 | Inoue et al. | | 709/229 |
| 6,542,912 B2 * | 4/2003 | Meltzer et al. | | 705/39 |
| 6,560,339 B1 * | 5/2003 | Iwamura | | 380/201 |
| 6,570,079 B2 * | 5/2003 | Fukuda | | 84/602 |
| 6,584,564 B2 | 6/2003 | Olkin et al. | | |
| 6,609,196 B1 | 8/2003 | Dickinson, III et al. | | |
| 6,615,249 B2 * | 9/2003 | Schulte Am Hulse | | 709/217 |
| 6,615,264 B1 * | 9/2003 | Stoltz et al. | | 709/227 |
| 6,636,867 B2 * | 10/2003 | Robertson | | 1/1 |
| 6,647,417 B1 * | 11/2003 | Hunter et al. | | 709/225 |
| 6,674,874 B1 * | 1/2004 | Yoshida et al. | | 382/100 |
| 6,711,553 B1 * | 3/2004 | Deng et al. | | 705/57 |
| 6,721,793 B1 * | 4/2004 | Corless | | 709/229 |
| 6,728,731 B2 * | 4/2004 | Sarukkai et al. | | 1/1 |
| 6,728,773 B1 * | 4/2004 | Corless | | 709/229 |
| 6,745,231 B1 | 6/2004 | Megiddo | | |
| 6,865,671 B1 * | 3/2005 | Assmann | | 713/154 |
| 6,868,403 B1 * | 3/2005 | Wiser et al. | | 705/51 |
| 6,886,096 B2 | 4/2005 | Appenzeller | | |
| 6,986,037 B1 * | 1/2006 | Assmann | | 713/155 |
| 7,428,307 B2 * | 9/2008 | Hori et al. | | 380/277 |
| 7,523,490 B2 * | 4/2009 | Guo et al. | | 726/10 |
| 2002/0059529 A1 | 5/2002 | Beton et al. | | |
| 2004/0133775 A1 * | 7/2004 | Callas et al. | | 713/153 |
| 2005/0033974 A1 * | 2/2005 | Ansell et al. | | 713/193 |
| 2005/0039019 A1 | 2/2005 | Delany | | |
| 2005/0102511 A1 * | 5/2005 | Harris | | 713/167 |
| 2005/0114653 A1 * | 5/2005 | Sudia | | 713/158 |
| 2005/0198511 A1 | 9/2005 | Tomkow | | |
| 2007/0124602 A1 * | 5/2007 | Wald et al. | | 713/193 |
| 2007/0165865 A1 * | 7/2007 | Talvitie | | 380/286 |
| 2007/0219917 A1 * | 9/2007 | Liu et al. | | 705/59 |

FOREIGN PATENT DOCUMENTS

| | | |
|---|---|---|
| EP | 1187390 A1 | 3/2002 |
| WO | WO0031931 A1 | 6/2000 |
| WO | WO0217578 A3 | 2/2002 |
| WO | WO03/061241 | 7/2003 |

OTHER PUBLICATIONS

Schneier, 'Applied Cryptography', 2nd edition, John Wiley & Sons, 1996, ISBN 0-471-11709-9.

Krawczyk, et al, 'HMAC: Keyed-Hashing for message Authentication', 6,584,564 B2, Feb. 1997.

International Search Report, PCT/US2006/046205, Apr. 13, 2007, pp. 1-11.

Ben Adida, David Chau, Susan Hohenberger and Ronald L. Rivest; Lightweight Signatures for Email; Jun. 24, 2005; Computer Science and Artifical Intelligence Laboratory; Massachusetts Institute of Technology; 32 Vassar Street; Cambridge, MA 02139 USA.

D.K. Smetters; Domain-Based Administration of Identity-Based Cryptosystems for Secure Email and IPSEC; Security '03 Paper; Aug. 4-8, 2003; 12th USENIX Security Symposium, Washington, D.C.; https://www.usenix.org/events/sec03/tech/full_papers/smetters/smetters_html/.

John P. Jones, Daniel F. Berger, and Chinya V. Ravishankar; Layering a Public Key Distribution Service Over Secure DNS: "Everybody Comes to RIKS"; Technical Report No. UCR-CS-2005-03059; Mar. 18, 2005; Department of Computer Science & Engineering, University of California Riverside; Riverside, CA 92521; http://www.cs.ucr.edu/~jjones/iks.pdf.

James M. Galvin, CommerceNet, Glenwood, MD; Public Key Distribution with Secure DNS; Jul. 1996; Sixth USENIX UNIX Security Symposium; San Jose California; https://www.usenix.org/publications/library/proceedings/sec96/full_papers/galvin/galvin.ps.

The Open Source Group, S/MIME Gateway Profile, © Mar. 2004 The Open Group.

CN Patent Application 200680045645.0; First Office Action and English Translation; Feb. 23, 2011.

CL2971-2006, Including O/A dated Feb. 24, 2010 (and English explanation) and any future O/As.

"European Search Report", Mailed Date: Feb. 10, 2011, Application No. EP/06844773, Filed Date: Feb. 9, 2011, pp. 8.

Eastlake, et al., "Storing Certificates in the Domain Name System (DNS)", Retrieved at << http://www.faqs.org/rfcs/rfc2538.html >>, Mar. 1, 1999, pp. 12.

PCT/US2006/046205, Including Written Opinion dated Apr. 13, 2007 (including International Search Report submitted Jan. 23, 2008).

Chile 2971-2006, Including O/A dated Sep. 8, 2008 (English translation attached).

AU2006322124, Including O/A dated May 10, 2010 and any future O/As.

CN Patent Application 200680045645.0; Second Office Action and English Translation; Nov. 17, 2011 (MS #315211.10).

* cited by examiner

KEY DISTRIBUTION FOR SECURE MESSAGING

RELATED APPLICATIONS

This application claims priority benefit of U.S. Provisional Patent Application No. 60/742,639, filed on Dec. 6, 2005, by one or more of the present inventors and assigned to Microsoft Corporation, the assignee of the present application.

BACKGROUND

The present description relates to key distribution for secure messaging.

SUMMARY

Described herein are systems and techniques by which a transmitting end point for implementing network communication may utilize a retrieved public key that is associated with an intended recipient, the recipient's network device, a gateway with which the intended recipient is associated, or a domain with which with the intended recipient is associated to secure an outbound message. At a receiving node, a retrieved public key that is associated with a source, the source's network device, a gateway with which the source is associated, or a domain with which with the source is associated may be utilized to authenticate and validate the secured message.

DESCRIPTION OF THE DRAWINGS

The present description references the following figures.

DETAILED DESCRIPTION

The description pertaining to key distribution may relate to systems, methodologies, techniques, processes, instructions, routines, and tools that may be utilized to secure messaging from one end point for implementing network communication to at least one other such end point.

"Domain," as referenced herein, may refer to, but not be limited to, one or more organizational logical collections of network end points that are capable of implementing network communication that may share a common naming suffix; such devices including, but not limited to, servers, client devices, or other device or various combinations thereof. [An organization may have multiple domains.]

"Gateway," as referenced herein, may refer to, but is not limited to, one or more devices that facilitate interaction between two or more domains, networks, or sub-networks. Thus, a gateway may function as either an entry point or an exit point for a respective domain or network. Transport protocol conversion may not be required, but some form of processing is typically performed.

Figure 1:
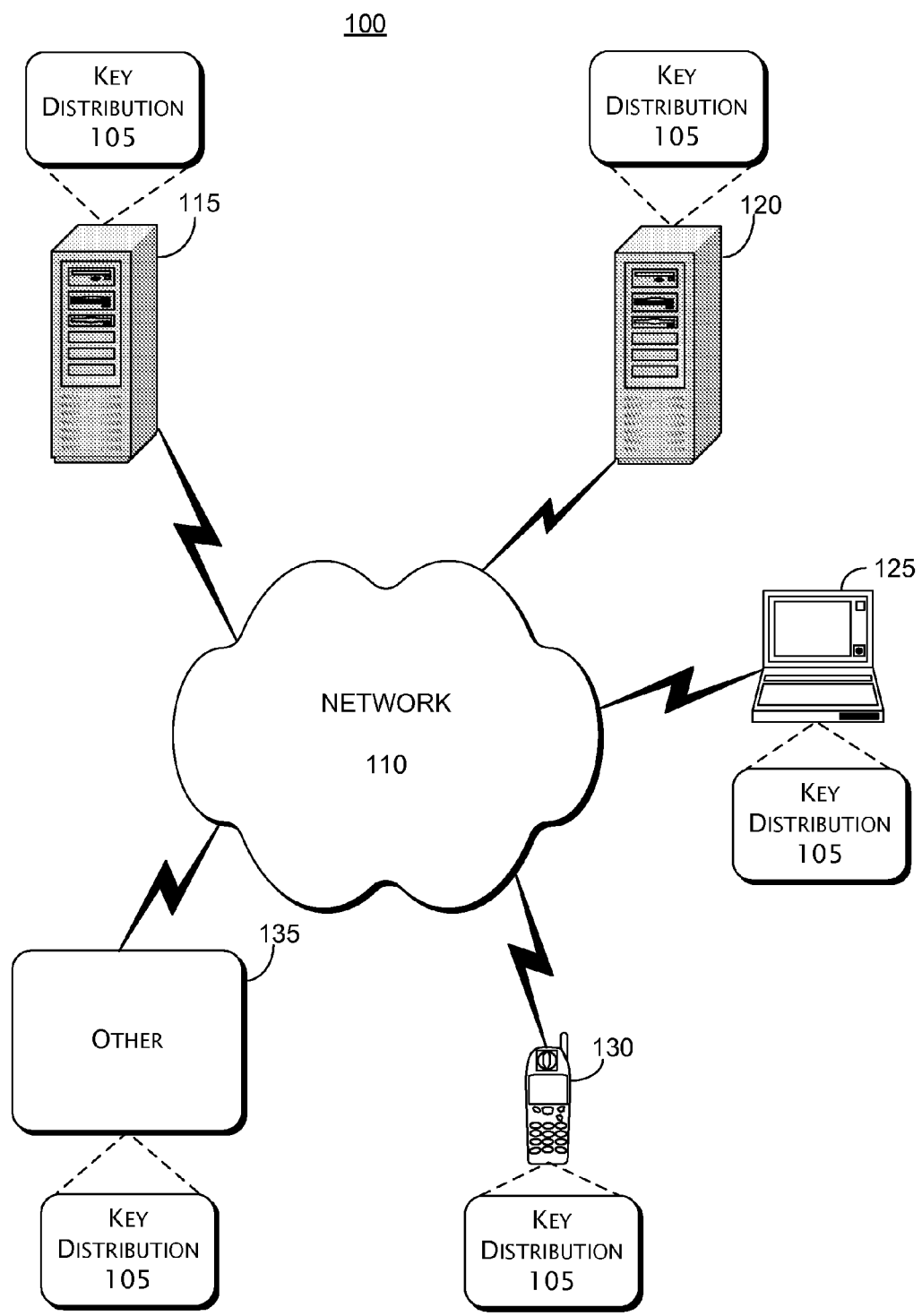
FIG. 1 shows network communication nodes, with the nodes implementing example technologies pertaining to key distribution.

FIG. 1 shows example network environment 100 in which example technologies for key distribution 105 may be implemented over network 110. In FIG. 1, server devices 115 and 120, client device 125, handheld client device 130, and "other" device 135 may be end points for implementing network communication that are coupled to one another via network 110; and, further, at least one of server devices 115 and 120, client device 125, handheld client device 130, and "other" device 135 may be end points for implementing network communication that are capable of implementing the aforementioned technologies.

Server devices 115 and 120 may represent devices, or end points for implementing network communication, that serve as domain gateways or are otherwise capable of transmitting and receiving messages (i.e., electronic packages) or any other of a variety of data and/or functionality to other devices in network environment 100. Implementations of key distribution 105 may be applicable to an exchange of electronic packages between server devices 115 and 120 in the clear (i.e., without any security measures implemented thereon); although alternative implementations may be applicable even if data to be exchanged is restricted to certain users or only if an appropriate subscription or licensing fee is paid. Server devices 115 and 120 may be at least one of a gateway, mail transport agent (MTA), domain server, network server, application server, blade server, or any combination thereof. Typically, server devices 115 and 120 may represent devices that may be a content source, and client devices 125 and 130 may represent any device that may receive such content either via network 110 or in an off-line manner. However, according to the example implementations described herein, server devices 115 and 120 and client devices 125 and 130 may interchangeably be sending nodes or receiving nodes in network environment 100. More particularly, relative to each other, server devices 115 and 120 may interchangeably be a sending node and a receiving node. "Other" device 135 may also be embodied by any of the above examples of server devices 115 and 120.

Client device 125 may represent at least one of a variety of known computing devices, or end points for implementing network communication, including a laptop computer, desktop personal computer (PC), workstation, mainframe computer, Internet appliance, media center, or set-top box that may be associated with network 110 by either a wired or wireless link, and is able to implement example technologies associated with key distribution 105. Further, client device 125 may represent the client devices described above in various quantities and/or combinations thereof. "Other" device 135 may also be embodied by any of the above examples of client device 125.

Handheld client device 130 may represent at least one device that is capable of being associated with network 110 by a wireless link, including a mobile (i.e., cellular) telephone, personal digital assistant (PDA), music player, video player, etc., and is able to implement example technologies associated with key distribution 105. Further, handheld device 130 may represent the handheld devices described above in various quantities and/or combinations thereof. "Other" device 135 may also be embodied by any of the above examples of handheld client device 130.

"Other" device 135 may represent any further device or end point for implementing network communication that is capable of implementing technologies associated with key distribution 105 according to one or more of the example implementations described herein. That is, "other" device 135 may represent any computing device that is capable of at least storing and sharing security information for any other of the devices associated with network 110, and sending or receiving electronic packages (e.g., e-mail) to any other devices associated with network 110. Thus, "other" device 135 may be a hardware device or a computing device having at least one of an operating system, an interpreter, converter, compiler, or runtime execution environment implemented thereon. These examples are not intended to be limiting in any way, and therefore should not be construed in that manner.

Network 110 may represent any of a variety of conventional network topologies and types, which may include wired and/or wireless networks. Network 110 may further utilize any of a variety of conventional network protocols, including public and/or proprietary protocols. Network 110 may include, for example, the Internet as well at least portions of one or more local area networks (also referred to, individually, as a "LAN"), such as an 802.11 system or, on a larger scale, a wide area network (i.e., WAN"); or a personal area network (i.e., PAN), such as Bluetooth.

Figure 2:
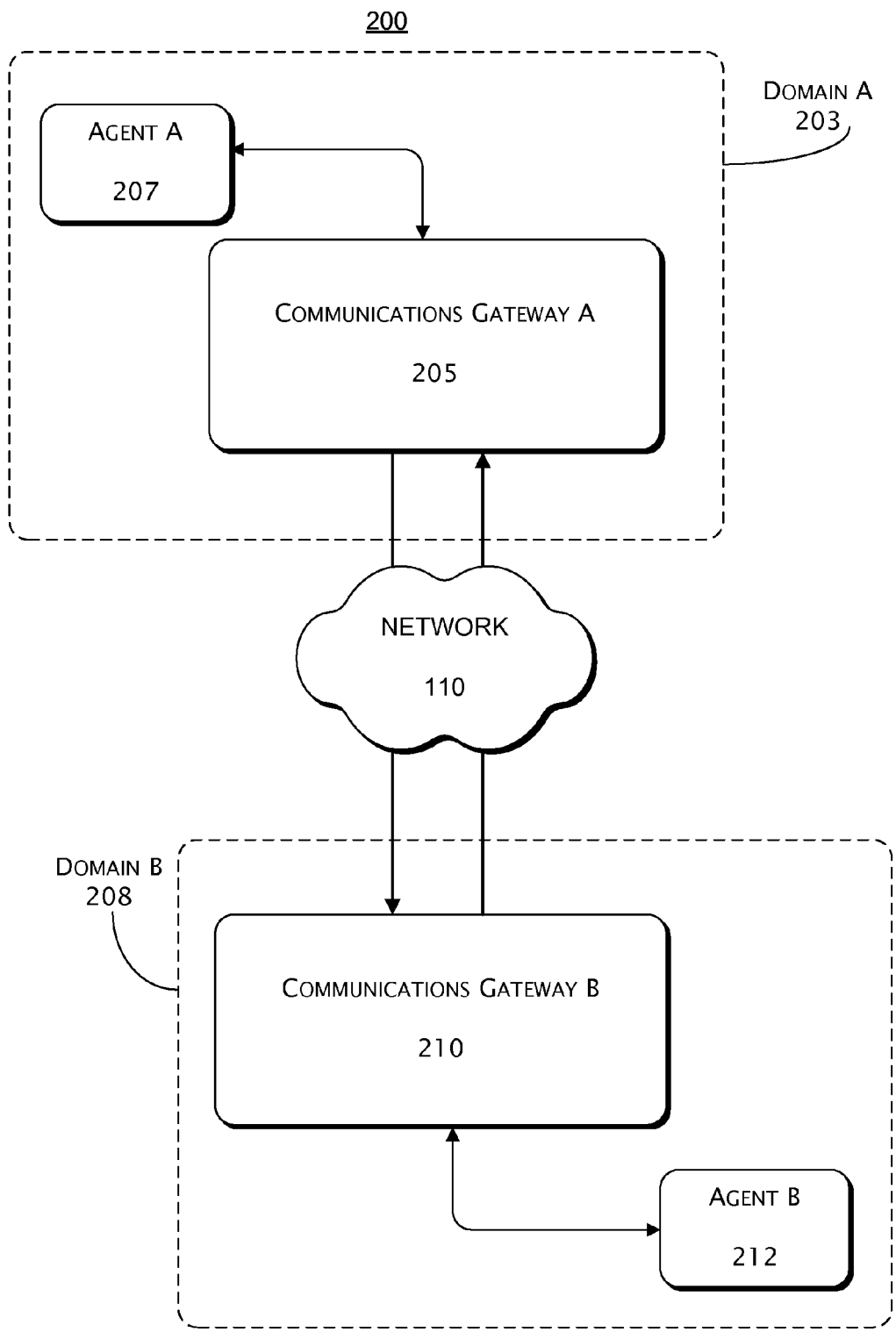
FIG. 2 shows an example configuration of communications agents and corresponding communications gateways communicating over a network, implementing example technologies pertaining to key distribution.

FIG. 2 shows example network environment 200 in which communication agents and corresponding communications gateways communicate over network 110, implementing example technologies pertaining to key distribution 105 (see FIG. 1).

Communications gateway A 205 may represent a gateway device, MTA (e.g., SMTP server), or a combination thereof on domain A 203. Communications gateway A 205 may further be implemented as a domain name server having a distributed database as part of the domain naming system (DNS), although such implementation is described only as an example. Alternative implementations of communications gateway A 205 may be independent of the DNS. Communications gateway A 205 may be capable of transmitting and receiving messages (i.e., electronic packages) to other devices, on behalf of agent A 207, over network 110. Such transmitting and receiving of messages may be implemented by, e.g., simple mail transfer protocol (SMTP).

Agent A 207 may represent at least one of a variety of functionalities implemented on one or more end points for implementing network communication on domain A 203 capable of transmitting a message (i.e., electronic package) to one or more nodes on network 110. Such devices may include, but are not limited to a client device or handheld device. More particularly, agent A 207 may be a source of an electronic message that is intended for a user associated with a counterpart agent associated with network 110. The electronic messages referenced herein may include e-mail that may or may not have one or more files attached thereto. Such an attached file may include, as non-limiting examples, a text file, an audio file, a video file, a uniform resource locator (URL), etc. Alternative implementations of key distribution 105 may further contemplate scenarios in which the electronic message is an instant message, a stream of data, a stream of audio packets such as those utilized by voice over IP (VoIP) protocols, RSS, TLS, RFC, or a direct download of electronic packets (i.e., text, audio, video, etc.) from an agent in one domain to an agent in another domain. Even further alternative implementations may contemplate such electronic messages being transmitted from one domain server to another domain server, typically as directed by an agent.

Network 110, as described above, may represent any of a variety of conventional network topologies and types, which may include wired and/or wireless networks. Network 110 may include, for example, the Internet as well at least portions of one or more LANs, a WAN, or a PAN.

Communications gateway B 210 may be a gateway device or MTA on domain B 208. That is, communications gateway B 210 may be an intended receiving gateway counterpart to transmitting communications gateway A 205. Similar to communications gateway A 205, communications gateway B 210 may further be implemented as a domain name server having a distributed database as part of the domain naming system (DNS) or, alternatively, independent of the DNS.

Agent B 212, accordingly, may be a receiving counterpart to sending agent A 207 from which a message (i.e., electronic package) may originate. Agent B 212 may be associated with a user in domain B 208 to which the message is intended.

Key distribution 105, according to at least one example in network environment 200, may include securing a message that is sent from agent A 207 via transmitting communications gateway A 205 using a key that is associated with domain B 208 and is retrieved from a DNS database. The DNS database may or may not be physically disposed in domain B 208. The intended recipient may be a recipient agent (i.e., device) or a user to which the agent is associated. Furthermore, though the implementations of key distribution 105 described herein are not beholden to any particular transmitting protocol, and therefore no such limitations should be inferred, the present description may contemplate messages being transmitted between domains using SMTP. The example of key distribution 105 may also contemplate authenticating and validating a message at receiving communications gateway B 210 using at least one key retrieved from a DNS database (i.e., server) associated with domain A 203, which is the domain corresponding to a source of the message. Thus, an example implementation of key distribution may be described as follows.

Agent A 207 may be a client device from which an outbound message (i.e., electronic package) intended for agent B 212, or a user associated therewith, originates. The outbound message may be received at communications gateway A 205, which, similar to agent A 207, may be associated with domain A 203.

Communications gateway A 205 may retrieve a public encryption key associated with domain B 208 from a DNS database. At least one alternative implementation may include the aforementioned public encryption key associated with domain B 208 corresponding more particularly to a user associated with domain B 208, and such implementation may be contemplated by the present description. Though the DNS database stores one or more encryption keys for domain B 208, the DNS database may or may not be associated with communications gateway B 210. Agent B 212, or a user associated therewith, may not necessarily be the only intended recipient of the outbound message, and therefore communications gateway A 205 may further retrieve a public encryption key for other domains to which intended recipients of the message are associated. However, in the present description, agent B 212, or a user associated therewith, may be the sole intended recipient of the message from agent A 207.

Having retrieved the public encryption key associated with domain B 208 or a user associated with domain B 208, communications gateway A 205 may utilize the retrieved key to secure the outbound message. According to at least one implementation of key distribution 105, communications gateway A 205 may secure the outbound message by generating a symmetric key (alternatively referred to as a "content encryption key" or "CEK") and secure the outbound message using the retrieved key and the randomly generated encryption key in combination together. According to at least one implementation, the secured outbound message includes securing at least a portion of the identity or address of at least one of the sender and one or more intended recipients of the secured message as part of, or separate from, a secured portion of the message itself.

The example implementations of key distribution 105 described herein contemplate the usage of RSA (Rivest-Shamir-Adleman) private/public key pairs. However, key distribution 105 is not so limited, and no such limitations should be inferred. For instance, alternative implementations may utilize Diffie-Hellman secret key pairs as described further below or other cryptography methods that exploit a public and private encryption key pairing.

Regardless, after securing the outbound message, communications gateway A 205 may then transmit the secured outbound message, via network 110, to domain gateway 210 corresponding to intended recipient agent B 212 or a user associated therewith.

Communications gateway B 210, upon receiving the secured message from communications gateway A 205 via network 110, may determine domain A 203 to be the source of the secured message. Therefore, communications gateway B 210 may retrieve a public verification key associated with domain A 203 from a DNS database or from a storage device associated with domain A 203. Alternative implementations may contemplate the public verification key associated with domain A 203 corresponding more particularly to a user of agent A 207 from which the message originates. Such implementations are contemplated throughout the present description. Though the DNS database stores one or more encryption keys for domain A 203, the DNS database may or may not be associated with communications gateway A 205.

According to at least one alternative implementation, communications gateway B 210 may utilize the retrieved public verification key associated with domain A 203 in combination with the private decryption key corresponding domain B 208 to decrypt and validate the symmetric key, which may be used to decrypt and validate the content of the message. By one or more implementations, the private decryption key may be the private counterpart to the public verification key utilized by communications gateway A 205 to secure the outbound message. The private decryption key may be locally stored at domain B 208 or may be otherwise associated with domain B 208. Regardless, the private encryption key may be utilized to decrypt an encryption key by which the secured message has been signed. That is, communications gateway B 210 may utilize the private encryption key, which is the private counterpart to the public key retrieved by communications gateway A, to decrypt the symmetric key and then authenticate and validate the secured message. Further, a signature associated with the decrypted encryption key may be validated using the retrieved public encryption key associated with domain A 203.

The decrypted decryption key may then be used to decrypt the message, including the sender and/or one or more intended recipients of the message, depending upon which portions of address information associated with the message are secured. Consequently, the address of intended recipient agent B 212, or user associated therewith, may be revealed, and communications gateway B 210 may then forward the decrypted message to recipient agent B 212.

Figure 3:
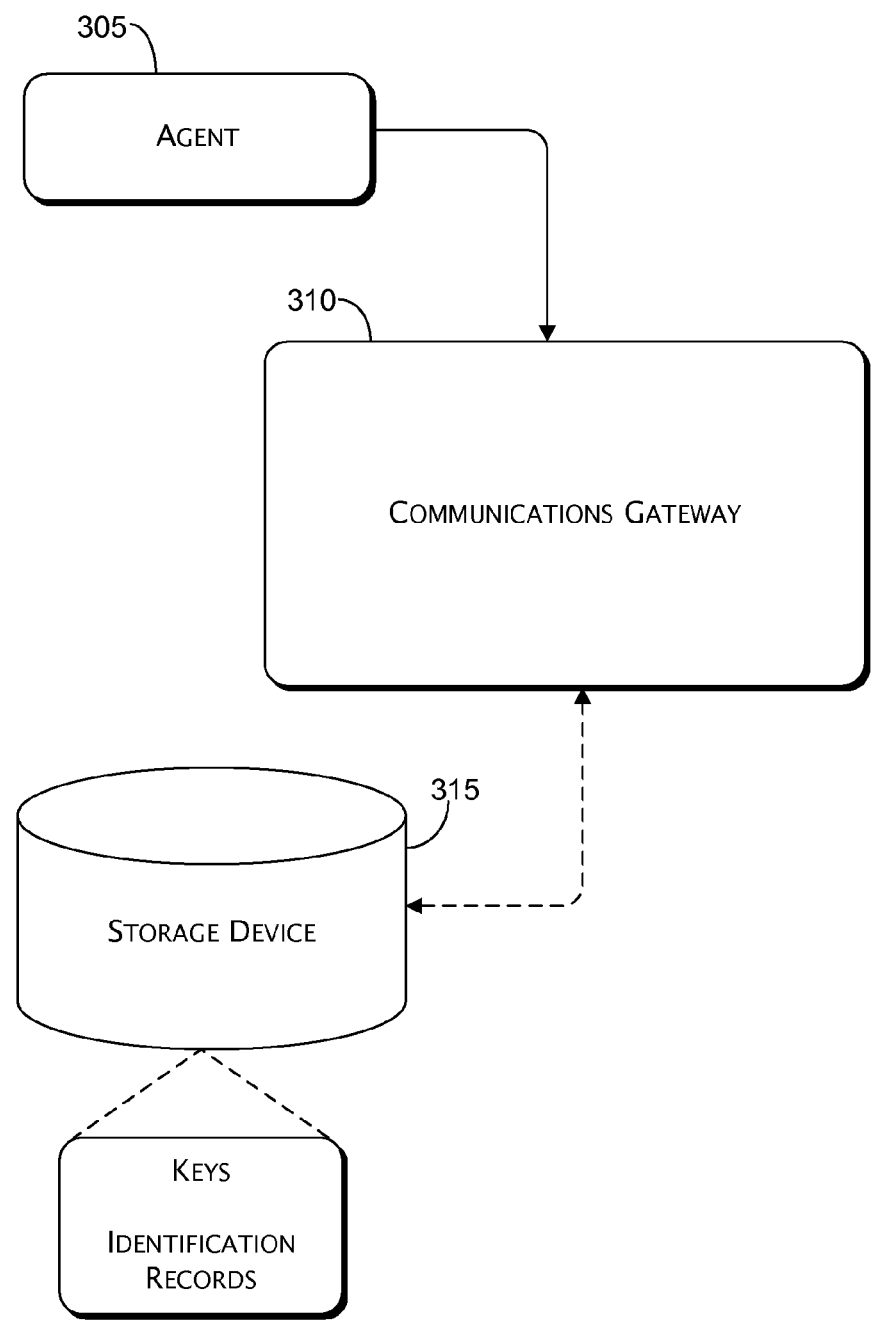
FIG. 3 shows an example configuration of a communications gateway, further to the example of FIG. 2.

FIG. 3 shows example configuration 300 of a communications gateway, further to the example of FIG. 2.

In the following description, various operations may be described as being performed by, or otherwise in association with, features described above with reference to FIGS. 1 and 2. Physical and operational features described with respect to configuration 300 may be implemented as hardware, firmware, or software, either singularly or in various combinations together.

Agent 305 may be representative of either agent A 207 or agent B 212 described above with reference to FIG. 2. More particularly, agent 305 may represent a client device, associated with a user, which is capable of originating a message (i.e., electronic package) to be transmitted to one or more nodes on network 110 and capable of receiving such a message via a corresponding communications gateway.

Communications gateway 310 may be representative of either transmitting communications gateway A 205 or receiving communications gateway B 210 described above with reference to FIG. 2, and therefore communications gateway 310 may be referred to as transmitting communications gateway 310 or receiving communications gateway 310 depending upon the role thereof. Further, communications agent 310 may represent a gateway device or MTA that may or may not be further implemented as a distributed database as part of the domain naming system (DNS).

Communications gateway 310 may be capable of transmitting and receiving messages (i.e., electronic packages) in relation to other devices, particularly other gateways, over network 110. Such transmitting and receiving of messages may be implemented by, e.g., SMTP.

Further still, transmitting communications gateway 310 may be capable of accessing a receiving communications gateway 310 or, alternatively, a DNS database to retrieve a corresponding public component of a private/public encryption key pair. In addition, a transmitting communications gateway 310 may be capable of generating random encryption keys according to various implementations of key distribution 105.

Storage device 315 may be associated with communications gateway 310 either logically or physically. That is, storage device 315 may be associated with a domain to which communications gateway 310 corresponds without being physically disposed within such domain. More particularly, storage device 315 may be a component of the distributed DNS database corresponding to the domain of communications gateway 310.

Storage device 315 may store, in various combinations thereof, one or more public and private encryption key pairs as well as domain-related identification records, which may be associated with the domain itself, an agent or device associated with the domain, or a user associated with the domain. For example, when associated with receiving communications gateway 310, storage device 315 may store one or more retrieved public encryption keys for the domain or an agent device corresponding to an intended recipient of an outbound message. Such retrieved public encryption keys may contribute to securing the outbound message. Alternatively, when associated with transmitting communications gateway 310, storage device 315 may store one or more public encryption keys for the domain, device, or user corresponding to the source of a secured message. Such retrieved public encryption keys may be used to authorize, validate, and decrypt the secured message.

Regardless of whether communications gateway 310 is a transmitting communications gateway or a receiving communications gateway, storage device 315 may also store therein private encryption keys corresponding to the domain to which communications gateway 310 is associated.

The pairs of private/public keys referenced above may include a domain-related encryption key and a domain-related signing key, which may or may not reference the same key, depending upon the implementation of key distribution 105.

Storage device 315 may further facilitate a trusting relationship between a transmitting communications gateway 310 and a receiving communications gateway 310 that may reduce the exposure of encryption keys at, particularly, transmitting communications gateway 310.

For example, transmitting communications gateway 310 may store therein an identity text record that includes a certificate corresponding to the public encryption key for the transmitting domain concatenated to a certificate corresponding to a public signing key associated with the transmitting domain; that are further concatenated to an authority certificate by which the other certificates are signed. The identity text record may be retrieved in advance, authenticated either manually or using a private key infrastructure (PKI), and may be used for sending and receiving secure messages. Regardless, receiving communications gateway 310 may access the public encryption key and public signing key for the transmitting domain by decrypting the authority certificate for the transmitting domain. Such decryption may be performed using the public authority key for the transmitting domain, which may be retrieved and/or stored by receiving communications gateway 310.

Figure 4:
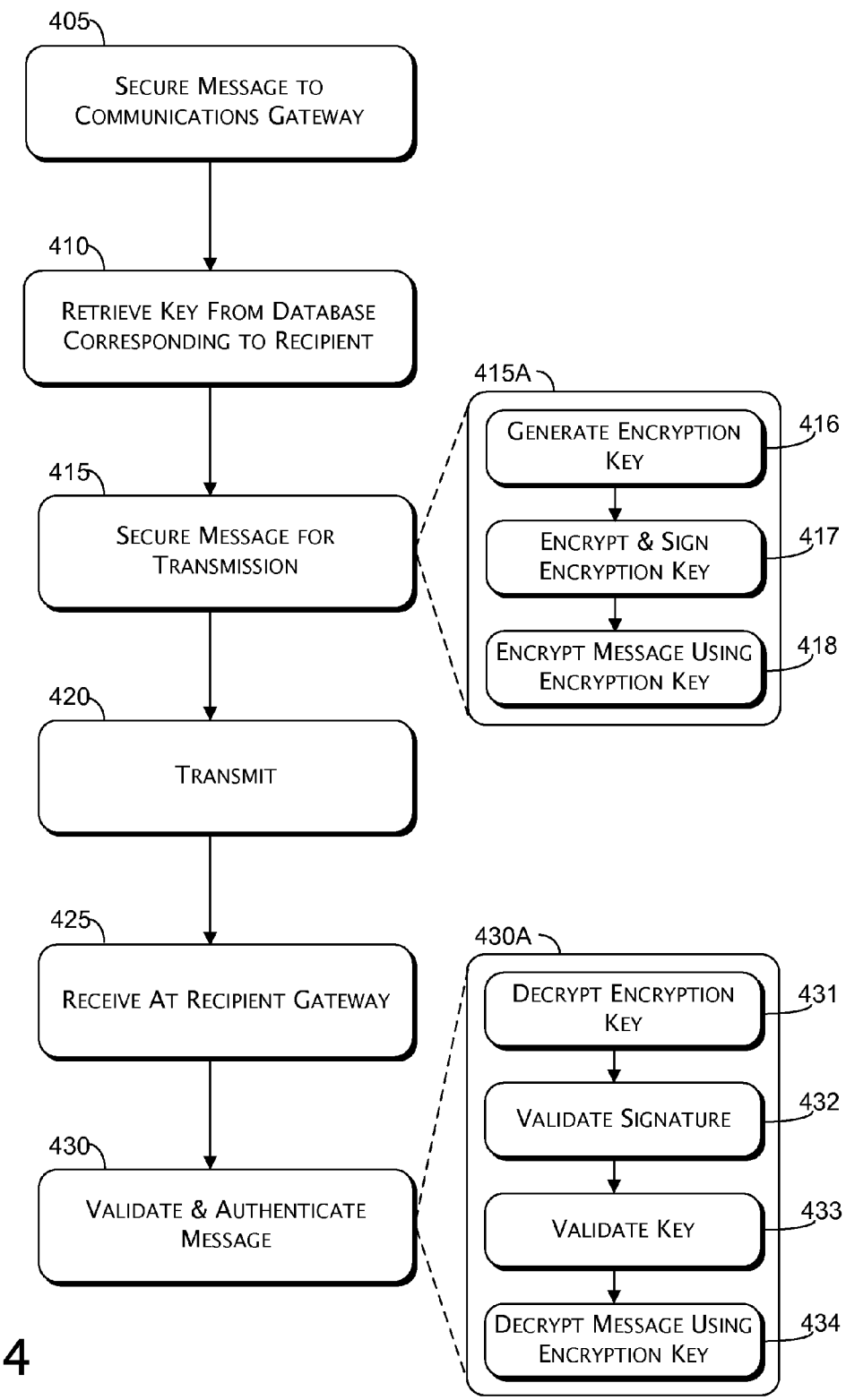
FIG. 4 shows an example processing flow according to at least one implementation of key distribution.

FIG. 4 shows example processing flow 400 according to at least one implementation of key distribution 105 (see FIG. 1). Various operations described as part of processing flow 400 may be attributed as being performed by, or otherwise in association with, features described above with reference to FIGS. 1-3. Such attributions, as well as the operations, are described as examples only, and the operations may be implemented as hardware, firmware, or software, either singularly or in various combinations together.

Processing flow 400 is described below with reference to example implementations A, B, and C. Such implementations are not described in any order of preference, nor are the implementations to be construed as limiting in scope. Rather, the example implementations are provided to illustrate the flexibility and variance enabled by key distribution 105. Further, the sequences by which example implementations A, B, and C are illustrated and described may vary, and therefore the example implementations of processing flow 400 should be viewed as non-limiting examples.

Example Implementation A

Block 405 may refer to communications gateway A 205 receiving a message (i.e., electronic package) from agent A 207 (i.e., client device) or a user to which agent A 207 is associated for transmittal beyond domain A 203. According to at least one alternative implementation, block 405 may refer to communications gateway A 205 as a content source independent of agent A 207. Regardless, block 405 may refer to at least one intended recipient of the message received at communications gateway A 205 being associated with domain B 208.

Block 410 may refer to communications gateway A 205 retrieving a public encryption key associated with domain B 208, although alternative implementations may contemplate the public encryption key associated with domain B 208 corresponding more particularly to an agent or device associated with domain B 208 or a user associated with domain B 208. Thus, communications gateway A 205 may access a DNS server, which may or may not be associated with communications gateway B 210, to retrieve a public encryption key associated with domain B 208.

Block 415 may refer to communications gateway A 205 securing the outbound message using at least the public encryption key associated with domain B 208 as well as a public encryption key associated with domain A 203, which may be stored locally at, or otherwise associated with, domain A 203. Alternative implementations may contemplate the public encryption key associated with domain A 203 corresponding more particularly to an agent or device associated with domain A 203 or a user associated with domain A 203.

More particularly, block 415 may refer to communications gateway A 205 encrypting the outbound message using the public encryption key associated with domain B 208 and attaching a signature that may be produced using a public encryption key associated with domain A 203. Encrypted portions of the message may include address information relating to at least one of the sender or intended recipient of the message. The signature may be produced using a public encryption key associated with domain A 203 as a component in an encrypted hash algorithm that is applied to at least a portion of the contents of the outbound message.

Block 420 may refer to the secured message being transmitted from communications gateway A 205 to communications gateway B 210 over network 110. Typically, block 420 may refer to the secured message being transported in accordance with SMTP. Key distribution 105, however, is not beholden to SMTP.

Block 425 may refer to the secured message being received at communications gateway B 210.

Block 430 may refer to communications gateway B 210 validating and authenticating the secured message. By this first example, communications gateway B 210 may detect that the secured message originated from domain A 203. Communications gateway B 210 may then retrieve the public signing key associated with domain A 203 from a DNS server which may or may not be associated with communications gateway A 205. The retrieved public signing key associated with domain A 203, which may be selected in accordance with an indication associated with the secured message, may be used to authenticate the signature of the secured message. That is, the public signing key is used to decrypt, de-hash, and therefore authenticate, the signature of the secured message.

In the event that a trust or partner relationship has been established between domain A 203 and domain B 208, a public signing key associated with domain A 203 may be accessed by communications gateway B 210 by authenticating an identity record stored in storage device 315 corresponding to communications gateway A 205. That is, communications gateway B 210 may access the public encryption key and public signing key associated with domain A 203 by decrypting the authority certificate for domain A 203 using the public authority key associated with domain A 203, which may have been used to sign the text identity record that includes certificates corresponding to the public encryption key and public signing key associated with domain A 203. The authority certificate for domain A 203 may be retrieved by communications gateway B 210 from the DNS server associated with domain A 203; or the authority certificate for domain A 203 may be retrieved by communications gateway B 210 from a local storage associated with domain B 208.

Regardless, block 430 may further refer to communications gateway B 210 using the private encryption key associated with domain B 208 to decrypt the authenticated message, including portions of address information that may have been encrypted, which was encrypted at communications gateway A 205 using the public encryption key associated with domain B 208.

Having authenticated and decrypted the secured message at block 430, communications gateway B 210 may then transmit the un-secured message to the intended recipient agent B 212.

Example Implementation B

Block 405 may refer to communications gateway A 205 receiving a message (i.e., electronic package) from agent A 207 (i.e., client device) or a user to which agent A 207 is associated for transmittal beyond domain A 203. According to at least one alternative implementation, block 405 may refer to communications gateway A 205 as a content source independent of agent A 207. Regardless, block 405 may refer to at least one intended recipient of the message received at communications gateway A 205 being associated with domain B 208.

Block 410 may refer to communications gateway A 205 retrieving a public encryption key associated with domain B 208, although alternative implementations may contemplate the public encryption key associated with domain B 208 corresponding more particularly to an agent or device associated with domain B 208 or a user associated with domain B 208. Thus, communications gateway A 205 may access a DNS server, which may or may not be associated with communications gateway B 210, to retrieve a public encryption key associated with domain B 208.

Block 415A may refer to communications gateway A 205 securing the outbound message in accordance with the processing described for, at least, blocks 416-418.

Block 416 may refer to communications gateway A 205 generating a symmetric key (i.e., CEK).

Block 417 may refer to communications gateway A 205 using at least the public encryption key associated with domain B 208 to encrypt the symmetric key, and further signing the symmetric key using at least the public encryption key associated with domain A 203, which may be stored locally at, or otherwise associated with, domain A 203.

Block 418 may refer to communications gateway A 205 using the symmetric key to encrypt and hash at least a portion of the contents of the outbound message, which may or may not include portions of address information regarding a sender and an intended recipient of the outbound message. The message may be cryptographically hashed using HMAC (Keyed-Hashing for Message Authentication) or another known key-based hashing function.

Block 420 may refer to the secured message being transmitted from communications gateway A 205 to communications gateway B 210 over network 110. Typically, block 420 may refer to the secured message being transported in accordance with SMTP. Key distribution 105, as stated above, is not beholden to SMTP.

Block 425 may refer to the secured message being received at communications gateway B 210.

Block 430A may refer to communications gateway B 210 validating and authenticating the secured message in accordance with the processing described for, at least, blocks 431-434.

Block 431 may refer to communications gateway B 210 using the private encryption key associated with domain B 208 and the public encryption key associated with domain A 203 to decrypt the symmetric key associated with the secured message. Such decryption is possible because, at communications gateway A 205, the symmetric key may have been encrypted using the public encryption key associated with domain B 208, and the symmetric key was signed using the private encryption key associated with domain A 203.

Block 432 may refer to communications gateway B 210 validating the signature on the encrypted symmetric key using the public signing key associated with domain A 203. That is, communications gateway B 210 may retrieve the public signing key associated with domain A 203 from a DNS server which may or may not be associated with communications gateway A 205. The retrieved public signing key associated with domain A 203 may be used to validate the signature by which the symmetric key was signed by recomputing the hash of the secure message, decrypting the signature, and comparing the hash values, and therefore authenticating, the signature.

As in example implementation A, the public signing key associated with domain A 203 may be accessed by communications gateway B 210 by authenticating an identity record stored in storage device 315 corresponding to communications gateway A 205. To do so, communications gateway B 210 may access the public encryption key and public signing key associated with domain A 203 by decrypting the authority certificate for domain A 203 using the public authority key associated with domain A 203, which may have been used to sign the text identity record that includes certificates corresponding to the public encryption key and public signing key associated with domain A 203. The authority certificate for domain A 203 may be retrieved by communications gateway B 210 from the DNS server associated with domain A 203; or the authority certificate for domain A 203 may be retrieved by communications gateway B 210 from a local storage associated with domain B 208.

Block 433 may refer to communications gateway B 210 using the decrypted symmetric key to validate the key-based hashing function (e.g., HMAC) used to cryptographically secure a message digest.

Block 434 may refer to communications gateway B 210 decrypting the encrypted portions of the secured message, including encrypted address information, using the symmetric key.

Having authenticated and decrypted the secured message at block 430A, communications gateway B 210 may then transmit the un-secured message to the intended recipient agent B 212.

Example Implementation C

Block 405 may refer to communications gateway A 205 receiving a message (i.e., electronic package) from agent A 207 (i.e., client device) or a user to which agent A 207 is associated for transmittal beyond domain A 203. According to at least one alternative implementation, block 405 may refer to communications gateway A 205 as a content source independent of agent A 207. Regardless, block 405 may refer to at least one intended recipient of the message received at communications gateway A 205 being associated with domain B 208.

Block 410 may refer to communications gateway A 205 retrieving a public encryption key associated with domain B 208, although alternative implementations may contemplate the public encryption key associated with domain B 208 corresponding more particularly to an agent or device associated with domain B 208 or a user associated with domain B 208. Thus, communications gateway A 205 may access a DNS server, which may or may not be associated with communications gateway B 210, to retrieve a public encryption key associated with domain B 208.

Block 415A may refer to communications gateway A 205 securing the outbound message in accordance with the processing described for, at least, blocks 416-418.

Block 416 may refer to communications gateway A 205 generating a symmetric key (i.e., CEK).

Block 416 may refer to communications gateway A 205 further generating a second random encryption key (i.e., "key encryption key" or "KEK").

Block 417 may refer to communications gateway A 205 using at least the public encryption key associated with domain B 208 to encrypt and sign the KEK. More particularly, communications gateway A 205 may encrypt the KEK using the public encryption key associated with domain B 208 and add thereto a hash of the KEK that is signed by the private key associated with domain A 203.

Block 418 may refer to communications gateway A 205 using the symmetric key and the encrypted and signed KEK to encrypt and hash at least a portion of the contents of the outbound message, which may or may not include portions of address information regarding a sender and an intended recipient of the outbound message. An example of the encrypted message may include at least a portion of the contents of the message encrypted by the symmetric key; added thereto the symmetric key encrypted by the KEK; and added thereto the encrypted KEK, described above as the KEK encrypted by the public encryption key associated with domain B 208 added to a hash of the KEK that is signed by the private key associated with domain A 203.

Block 418 may further refer to communications gateway A 205 using the symmetric key and the encrypted and signed KEK to sign the encrypted message. An example of the signed and encrypted message may include the encrypted message cryptographically hashed using HMAC or another key-based hashing function; added thereto the symmetric key encrypted by the KEK; and added thereto a newly encrypted KEK, which includes the KEK encrypted by the public encryption key associated with domain B 208 added to a hash of the KEK that is signed by the private key associated with domain A 203.

Block 420 may refer to the secured message being transmitted from communications gateway A 205 to communications gateway B 210 over network 110. Again, block 420 may refer to the secured message being transported in accordance with SMTP, although key distribution 105 is not so limited.

Block 425 may refer to the secured message being received at communications gateway B 210.

Block 430A may refer to communications gateway B 210 validating and authenticating the secured message in accordance with the processing described for, at least, blocks 431-434.

Block 431 may refer to communications gateway B 210 using the private encryption key associated with domain B 208 and the public encryption key associated with domain A 203 to decrypt the KEK associated with the secured message. Such decryption is possible because, at communications gateway A 205, the KEK was encrypted using the public encryption key associated with domain B 208, and the KEK was signed using the private encryption key associated with domain A 203. Using the decrypted KEK, the symmetric key used to encrypt at least a portion of the contents of the secured message may also be decrypted.

Block 432 may refer to communications gateway B 210 validating the signature on the encrypted KEK using the public signing key associated with domain A 203. That is, communications gateway B 210 may retrieve the public signing key associated with domain A 203 from a DNS server which may or may not be associated with communications gateway A 205. The retrieved public signing key associated with domain A 203 may be used to validate the signature by which the KEK was signed by recomputing the hash of the secure message, decrypting the signature, and comparing the hash values. Matching hash values, therefore, authenticates the signature.

As in example implementations A and B, the public signing key associated with domain A 203 may be accessed by communications gateway B 210 by authenticating an identity record stored in storage device 315 corresponding to communications gateway A 205. To do so, communications gateway B 210 may access the public encryption key and public signing key associated with domain A 203 by decrypting the authority certificate for domain A 203 using the public authority key associated with domain A 203, which may have been used to sign the text identity record that includes certificates corresponding to the public encryption key and public signing key associated with domain A 203. The authority certificate for domain A 203 may be retrieved by communications gateway B 210 from the DNS server associated with domain A 203; or the authority certificate for domain A 203 may be retrieved by communications gateway B 210 from a local storage associated with domain B 208.

Block 433 may refer to communications gateway B 210 using the decrypted KEK and symmetric key to validate the key-based hashing function (e.g., HMAC) used to cryptographically encrypt at least a portion of the contents of the secured message.

Block 434 may refer to communications gateway B 210 decrypting the encrypted portions of the secured message, including encrypted address information, using the KEK and symmetric key.

Having authenticated and decrypted the secured message at block 430A, communications gateway B 210 may then transmit the un-secured message to the intended recipient agent B 212.

It is noted that, for any of example implementations A, B, and C, the KEK may remain stable for prolonged periods of time (e.g., weeks), while the symmetric key may be generated on a per-message basis. Thus, the KEK may be encrypted, signed, and stored in accordance with any of the techniques described above, which enables the KEK to be re-used.

By the description above, pertaining to FIGS. 1-4, keys may be posted and retrieved for securing, authenticating, and validating messages (i.e., electronic packages) sent over a network from one domain to another. However, the example implementations described herein are not limited to just the network environments of FIGS. 1 and 2, the components of FIG. 3, or the processing flow of FIG. 4. Technologies (e.g., tools, methodologies, and systems) associated with key distribution 105 (see FIG. 1) may be implemented by various combinations of the components described with reference to FIG. 3, as well as in various orders of the blocks described with reference to FIG. 4.

Further, the computer environment for any of the examples and implementations described above may include a computing device having, for example, one or more processors or processing units, a system memory, and a system bus to couple various system components.

The computing device may include a variety of computer readable media, including both volatile and non-volatile media, removable and non-removable media. The system memory may include computer readable media in the form of volatile memory, such as random access memory (RAM); and/or non-volatile memory, such as read only memory (ROM) or flash RAM. It is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electric erasable programmable read-only memory (EEPROM), and the like, can also be utilized to implement the example computing system and environment.

Reference has been made throughout this specification to "an example," "alternative examples," "at least one example," "an implementation," or "an example implementation" meaning that a particular described feature, structure, or characteristic is included in at least one implementation of the present invention. Thus, usage of such phrases may refer to more than just one implementation. Furthermore, the described features, structures, or characteristics may be combined in any suitable manner in one or more implementations.

One skilled in the relevant art may recognize, however, that code module initialization may be implemented without one or more of the specific details, or with other methods, resources, materials, etc. In other instances, well known structures, resources, or operations have not been shown or described in detail merely to avoid obscuring aspects of the invention.

While example implementations and applications of the code module initialization have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the invention, as both described above and claimed below.

We claim:

1. At least one computer-readable storage medium having executable instructions that, when executed, cause one or more processors to:
    secure, by a communications gateway implemented as at least one domain name server of a domain, an electronic message for a sending agent associated with the domain, wherein the sending agent is a source of the electronic message, and wherein to secure the electronic message comprises:
        retrieving a public encryption key associated with at least one other domain of a receiving agent that is an intended recipient of the electronic message;
        generating a symmetric key associated with the domain associated with the sending agent;
        encrypting the electronic message using the symmetric key to provide an encrypted version of the electronic message; and
        encrypting the symmetric key using the public encryption key to provide an encrypted symmetric key;
    transmit, by the communications gateway on behalf of the sending agent, the encrypted version of the electronic message to at least one other communications gateway implemented as at least one other domain server of at least one other domain;
    receive, at the at least one other communications gateway on behalf of the receiving agent, the encrypted version of the electronic message;
    provide, by the at least one other communications gateway, a decrypted version of the electronic message to the receiving agent, wherein to provide the decrypted version of the electronic message comprises:
        retrieving a public verification key corresponding to the domain associated with the sending agent;
        utilizing the public verification key in combination with a private key corresponding to the at least one other domain to decrypt the encrypted symmetric key to provide a decrypted symmetric key, wherein the private key corresponding to the at least one other domain is stored locally at the at least one other domain and is a private counterpart to the public encryption key retrieved by the communications gateway; and
        decrypting the encrypted version of the electronic message using the decrypted symmetric key to provide the decrypted version of the electronic message; and
    forwarding the decrypted version of the electronic message to the receiving agent.

2. The at least one computer-readable storage medium of claim 1, wherein to transmit the encrypted version of the electronic message comprises transmitting the electronic message to the at least one other communications gateway in accordance with simple mail transfer protocol (SMTP).

3. The at least one computer-readable storage medium of claim 1, wherein the electronic message comprises an e-mail message.

4. The at least one computer-readable storage medium of claim 1, wherein the electronic message comprises an instant message.

5. The at least one computer-readable storage medium of claim 1, wherein the electronic message comprises a stream of data or a stream of one or more audio packets.

6. A method comprising:
    securing, by a communications gateway implemented as at least one domain name server of a domain, an electronic message for a sending agent associated with the domain that is the source of the electronic message, wherein securing the electronic message comprises:
    retrieving a public encryption key associated with at least one other domain of a receiving agent that is an intended recipient of the electronic message;
    generating a symmetric key associated with the domain associated with the sending agent;
    encrypting the electronic message using the symmetric key to provide an encrypted version of the electronic message that is decryptable by another communications gateway of another domain using the symmetric key; and
    encrypting the symmetric key using the public encryption key to provide an encrypted version of the symmetric key that is decryptable by the another communications gateway using a public verification key retrievable by the another communications gateway and a private key stored locally at the another domain, wherein the private key is the private counterpart to the public encryption key; and
    transmitting, by the communications gateway on behalf of the sending agent, the encrypted version of the electronic message to a receiving agent via the another communications gateway.

7. The method of claim 6, wherein transmitting comprises transmitting the electronic message to the at least one other communications gateway in accordance with simple mail transfer protocol (SMTP).

8. The method of claim 6, wherein the electronic message comprises an e-mail message.

9. The method of claim 6, wherein the electronic message comprises an instant message, a stream of data, or a stream of one or more audio packets.

10. A system comprising:
    a communications gateway implemented as at least one domain name server of a domain and configured to:

secure an electronic message for a sending agent associated with the domain that is the source of the electronic message, wherein to secure the electronic message comprises:

retrieving a public encryption key associated with at least one other domain of a receiving agent that is an intended recipient of the electronic message;

generating a symmetric key associated with the domain associated with the sending agent;

encrypting the electronic message using the symmetric key to provide an encrypted version of the electronic message; and encrypting the symmetric key using the public encryption key to provide an encrypted symmetric key;

transmit, on behalf of the sending agent, the encrypted version of the electronic message;

at least one other communications gateway implemented as at least one other domain server of at least one other domain and configured to:

receive, on behalf of the receiving agent, the encrypted version of the electronic message;

retrieve a public verification key corresponding to the domain associated with the sending agent;

utilize the public verification key in combination with a private key corresponding to the at least one other domain to decrypt the encrypted symmetric key to provide a decrypted symmetric key, wherein the private key corresponding to the at least one other domain is stored locally at the at least one other domain and is the private counterpart to the public encryption key;

decrypt the encrypted version of the electronic message using the decrypted symmetric key to provide a decrypted version of the electronic message; and forward the decrypted version of the electronic message to the receiving agent.

11. The system of claim 10, wherein to transmit the encrypted version of the electronic message comprises transmitting the electronic message to the at least one other communications gateway in accordance with simple mail transfer protocol (SMTP).

12. The system of claim 10, wherein the electronic message comprises an e-mail message.

13. The system of claim 10, wherein the electronic message comprises an instant message, a stream of data, or a stream of one or more audio packets.

* * * * *